US012591749B2

(12) United States Patent
Li et al.

(10) Patent No.: US 12,591,749 B2
(45) Date of Patent: Mar. 31, 2026

(54) MACHINE LEARNING SYSTEM FOR MULTI-DOMAIN LONG DOCUMENT CLUSTERING

(71) Applicant: Palo Alto Networks, Inc., Santa Clara, CA (US)

(72) Inventors: Tung-Ling Li, Fremont, CA (US); William Redington Hewlett, II, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 166 days.

(21) Appl. No.: 18/541,435

(22) Filed: Dec. 15, 2023

(65) Prior Publication Data

US 2025/0200296 A1 Jun. 19, 2025

(51) Int. Cl.
 *G06F 40/40* (2020.01)
 *G06N 20/00* (2019.01)
(52) U.S. Cl.
 CPC ............. *G06F 40/40* (2020.01); *G06N 20/00* (2019.01)
(58) Field of Classification Search
 CPC ................................. G06F 40/40; G06N 20/00
 USPC .................................... 704/2, 8–9, 237–239
 See application file for complete search history.

(56) References Cited

U.S. PATENT DOCUMENTS

2005/0203970 A1* 9/2005 McKeown ............. G06Q 10/10
 707/999.203
2021/0357762 A1* 11/2021 Clement .............. G06N 3/0495
2022/0114202 A1* 4/2022 Kuwabara ............. G06F 40/268

OTHER PUBLICATIONS

Gupta, et al., "Improving Document Classification with Multi-Sense Embeddings", arXiv: 1911.07918v1 [cs.CL] Nov. 18, 2019, 8 pages.
Mehta, et al., "WEClustering: word embeddings based text clustering technique for large datasets", Complex & Intelligent Systems (2021) 7: 14 pages.
Selva Birunda, et al., "A Review on Word Embedding Techniques for Text Classification", Innovative Data Communication Technologies and Application. Lecture Notes on Data Engineering and Communications Technologies, vol. 59, 15 pages, Springer, Singapore. https://doi.org/10.1007/978-981-15-9651-3_23.
Vahidnia, et al., "Embedding-based Detection and Extraction of Research Topics from Academic Documents Using Deep Clustering", Journal of Data and Information Science vol. 6, No. 3, 2021, 24 pages.

* cited by examiner

*Primary Examiner* — George C Monikang
(74) *Attorney, Agent, or Firm* — Gilliam IP PLLC

(57) ABSTRACT

A model pipeline has been created that allows an organization to gain a clear understanding of contents of a collection of documents despite varying lengths and multiple domain content. A collection of documents with content of different domains are normalized by summarizing the documents. For summarizing, the pipeline uses a language model that has been trained for text summarization across domains to a constrained summary length or length limit. The pipeline extracts embeddings of the summaries and clusters the summary embeddings. The pipeline uses the summaries to label the clusters using another language model that has been trained to generate a label or name for a cluster based on a set of summaries corresponding to a sample of cluster members. The labeled clusters can then be used to generate an organized presentation of the content of the documents in the document collection.

21 Claims, 4 Drawing Sheets

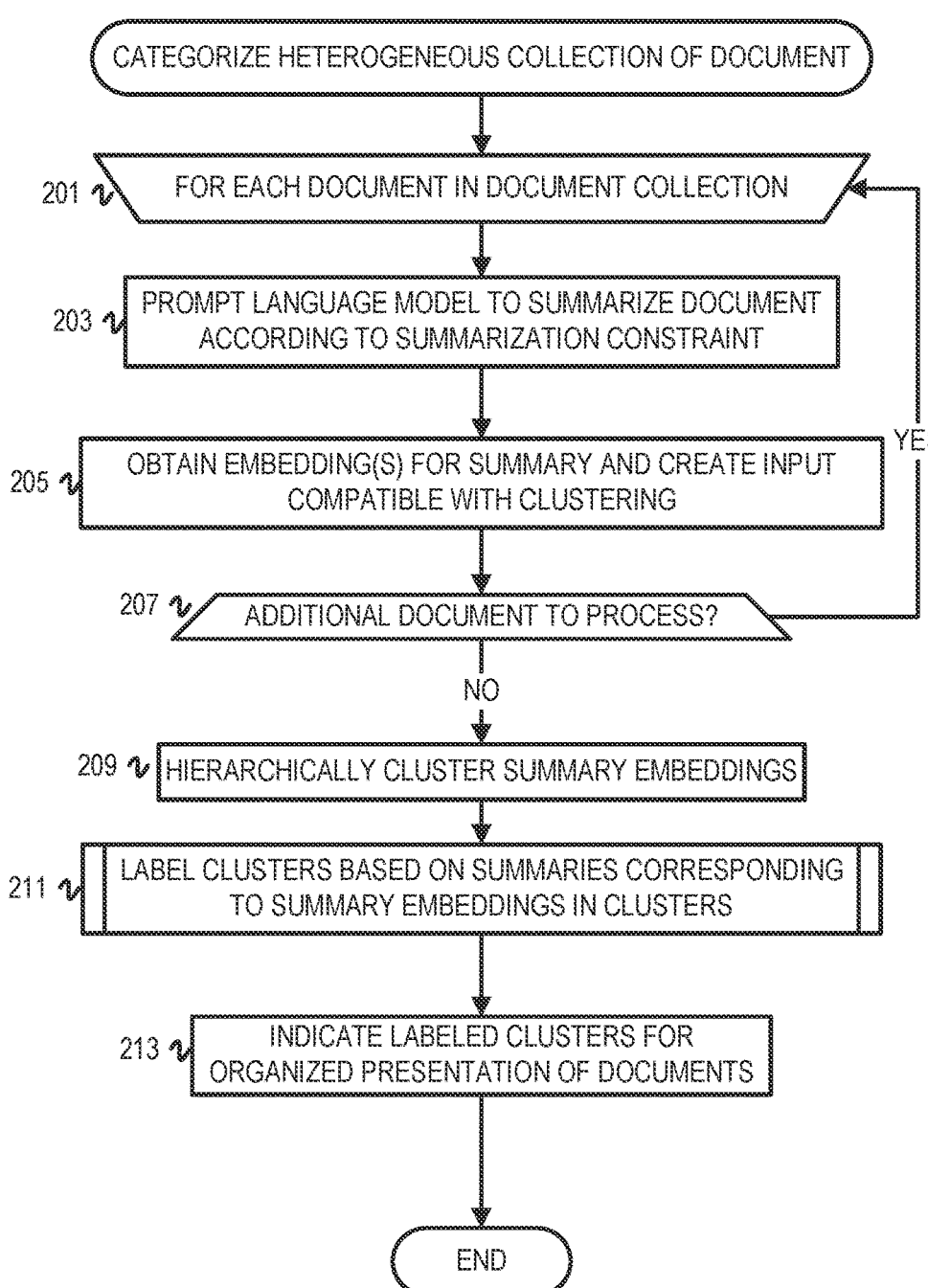

CATEGORIZE HETEROGENEOUS COLLECTION OF DOCUMENT

201   FOR EACH DOCUMENT IN DOCUMENT COLLECTION

203   PROMPT LANGUAGE MODEL TO SUMMARIZE DOCUMENT ACCORDING TO SUMMARIZATION CONSTRAINT

205   OBTAIN EMBEDDING(S) FOR SUMMARY AND CREATE INPUT COMPATIBLE WITH CLUSTERING

207   ADDITIONAL DOCUMENT TO PROCESS?

YES

NO

209   HIERARCHICALLY CLUSTER SUMMARY EMBEDDINGS

211   LABEL CLUSTERS BASED ON SUMMARIES CORRESPONDING TO SUMMARY EMBEDDINGS IN CLUSTERS

213   INDICATE LABELED CLUSTERS FOR ORGANIZED PRESENTATION OF DOCUMENTS

END

FIG. 2

MACHINE LEARNING SYSTEM FOR MULTI-DOMAIN LONG DOCUMENT CLUSTERING

BACKGROUND

The disclosure generally relates to machine learning (e.g., CPC subclass G06N 20/00) and handling natural language data (e.g., CPC subclass G06F 40/00).

Word embedding is used to transform words into n-dimensional vectors that can be processed by machine learning techniques, often for natural language processing (NLP) tasks including text or document classification/categorization. Word embedding maps words to n-dimensional vectors that are within an n-dimensional vector space. Similarity of words correlates to distance between the corresponding vectors. Techniques for word embedding can be organized into three types: traditional word embedding, static word embedding, and contextualized word embedding. An example technique of traditional word embedding is the term frequency-inverse document frequency (TF-IDF) algorithm. Example techniques of static word embedding include the word2Vec algorithm and the global vectors for word representation (GloVe) algorithm. Contextualized word embedding techniques use transfer learning with language models, such as the embeddings from language model (ELMo) method, the Bidirectional Encoder Representations from Transformers (BERT) model, and the generative pre-trained transformer 2 (GPT-2) large language model (LLM). Furthermore, these techniques have been adapted to generate sentence embeddings and paragraph embeddings.

BRIEF DESCRIPTION OF THE DRAWINGS

Embodiments of the disclosure may be better understood by referencing the accompanying drawings.

FIG. 2 is a flowchart of example operations for categorizing heterogenous documents.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

Clustering has been used to automate categorization of documents for organizations. However, these efforts have been impeded by varying document lengths and multiple domain content (e.g., natural language documents and computer program code). Documents having a "long" length (e.g., documents having more than 500 tokens) contain too much noise for quality clustering. A model pipeline has been created that allows an organization to gain a clear understanding of contents of a collection of documents despite varying lengths and multiple domain content. A collection of documents with content of different domains is normalized by summarizing the documents. For summarizing, the pipeline uses a language model that has been trained for text summarization across domains to a constrained summary length or length limit. The pipeline extracts embeddings of the summaries and clusters the summary embeddings. The pipeline uses the summaries to label the clusters using another language model that has been trained to generate a label or name for a cluster based on a set of summaries corresponding to a sample of cluster members. The labeled clusters can then be used to generate an organized presentation of the content of the documents in the document collection.

Example Illustrations

Figure 1:
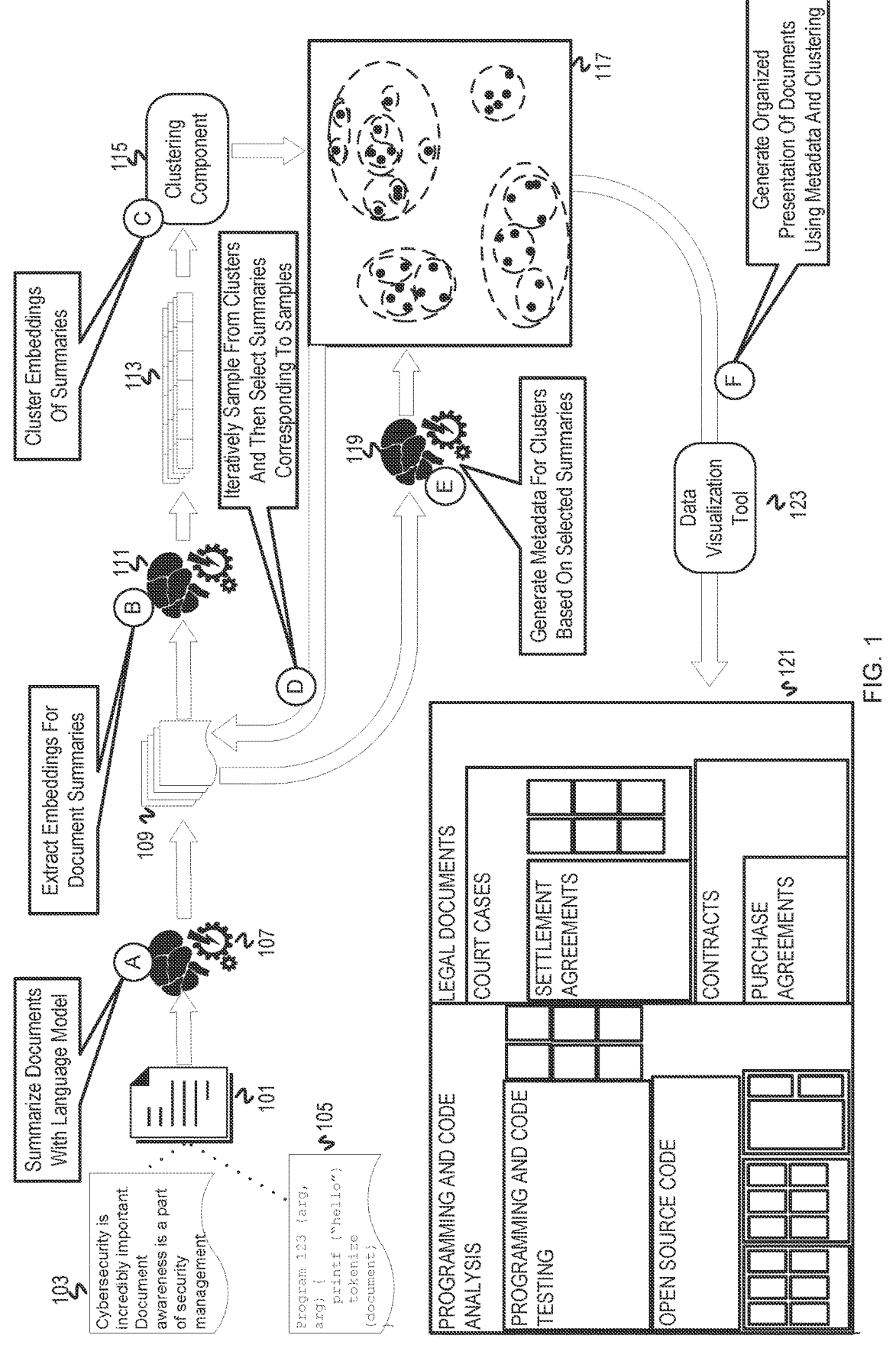
FIG. 1 is a diagram of a model pipeline that provides a high-quality document categorization for a document collection using text summarization and clustering of embeddings of the summaries.

FIG. 1 is a diagram of a model pipeline that provides a high-quality document categorization for a document collection using text summarization and clustering of embeddings of the summaries. The model pipeline includes a language model 107, an embedding model 111, a clustering component 115, and a language model 119. The language model 107 can be a lightweight or a large language model. The language model 107 was pre-trained to have the capability for one or more natural language processing (NLP) tasks at least including text summarization and has been further trained or fine-tuned to summarize a document to a constrained length. The language model 119 is another language model that was pre-trained to have the capability for one or more NLP tasks and then fine-tuned to generate a label and a description for a cluster based on a set of summaries. The clustering component 115 implements a hierarchical clustering algorithm. Although not depicted, the model pipeline also includes program code that connects the components together by invoking a component and passing output as input to a next component. In some implementations, the model pipeline includes functionality for processing output of one component as appropriate for a next component to consume.

A document collection 101 is depicted in FIG. 1 with content 103, 105 of a few example documents depicted. The example content 103, 105 illustrates the different domains represented in the document collection 101. The example content 103 is natural language content. The example content 105 is program code. While different domains of content or documents can be broadly categorized into a natural language domain and a program code domain, additional categories and more granular categories can be used to describe the different domains represented in a document collection. For instance, a document collection can include spreadsheets of corporate financial information and spreadsheets of experimental results, program code testing results, testing program code, database code, dataset sharding, experimental results, experiment design, model evaluation, etc. Some documents may be descriptions of program code or examples of program code which include program code and natural language text. The wide variety of documents illustrates the challenge of categorizing enterprise scale document collections and the utility of the disclosed model pipeline.

FIG. 1 is annotated with a series of letters A-F each representing a stage of one or more operations. Although these stages are ordered for this example, the stages illustrate one example to aid in understanding this disclosure and should not be used to limit the claims. Subject matter falling within the scope of the claims can vary from what is illustrated.

At stage A, the language model 107 summarizes documents. Each document can be input as a prompt to the language model 107 which will generate a summary of the document according to a length constraint (e.g., three sentences). Summaries 109 are passed to the embedding model 111. The model pipeline can pass the summaries 109 as a batch, in segments, or individually. The model pipeline maintains mappings of document identifiers to each artifact generated along the model pipeline.

At stage B, the model pipeline extracts sentence embeddings from the embedding model 111 based on the summaries. The model pipeline extracts sentence embeddings for each summary. Each summary is longer than a single sentence, thus the model pipeline aggregates the sentence embeddings of a summary into a single vector ("summary embedding"). The model pipeline passes summary embeddings 113 extracted from the embedding model 111 to a clustering component 115.

The clustering component 115 performs hierarchical clustering on the summary embeddings 113 to generate clusters 117. The clustering component 115 can run a clustering algorithm to perform agglomerative or divisive hierarchical clustering. The clustering component 115 pre-processes the summary embeddings 113 to generate an input format that can be accepted by the clustering algorithm being implemented by the clustering component 115. For instance, the clustering component 115 reduces dimensionality of each of the summary embeddings 113 and arranges the reduced summary embeddings 113 into a matrix.

At stage D, the model pipeline iteratively samples from clusters 117 and then selects summaries corresponding to the samples. The model pipeline iterates through each lowest level cluster and samples each lowest level cluster to select m members. The model pipeline then uses the previously mentioned mappings to identify and select those of the summaries 109 corresponding to the samples of cluster members.

At stage E, the model pipeline generates metadata for the clusters 117 based on the selected summaries. The metadata at least includes a cluster label, but can also include a cluster description that is a brief description of the contents of documents corresponding to a cluster. For each lowest level cluster, the model pipeline prompts the language model 119 to generate a label and a description based on the selected summaries. Assuming sample size m is 4, the model pipeline prompts the language model 119, for each lowest level cluster, with the 4 summaries corresponding to the sampled cluster members of the cluster to generate a label and description for the cluster. Metadata for higher level/parent clusters are derived from the metadata of the lowest level clusters. This will be described in more detail in FIG. 3. The cluster labels are used as categories of the documents in the collection 101.

At stage F, the model pipeline generates an organized presentation of the documents in the collection 101 using the metadata applied to the clusters 117 and the clustering. The model pipeline uses a data visualization tool 123 in this example illustration to render a presentation 121. For simplicity, the presentation 121 only includes 2 level 2 clusters with labels "Programming and Code Analysis" and "Legal Documents." Level 1 is considered the root cluster which includes all of the sub-clusters. The presentation 101 depicts rectangles of varying sizes for different categorizations that correspond to the clusters 117. The sizes of the rectangles are representative of the quantity of documents within a sub-cluster. As depicted, each of the level 2 clusters includes sub-clusters of varying sizes. The cluster labeled "Programming and Code Analysis" includes sub-clusters labeled "Programming and Code Testing," and Open Source Code." The cluster labeled "Legal Documents" includes sub-clusters labeled "Court Cases" and "Contracts." The sub-cluster labeled "Court Cases" includes a sub-cluster labeled "Settlement Agreements." The sub-cluster labeled "Contracts" includes a sub-cluster labeled "Purchase Agreements." Depending upon the data visualization tool 123, interaction with the presentation 121 can reveal the metadata of the smaller sub-clusters.

Figure 3:
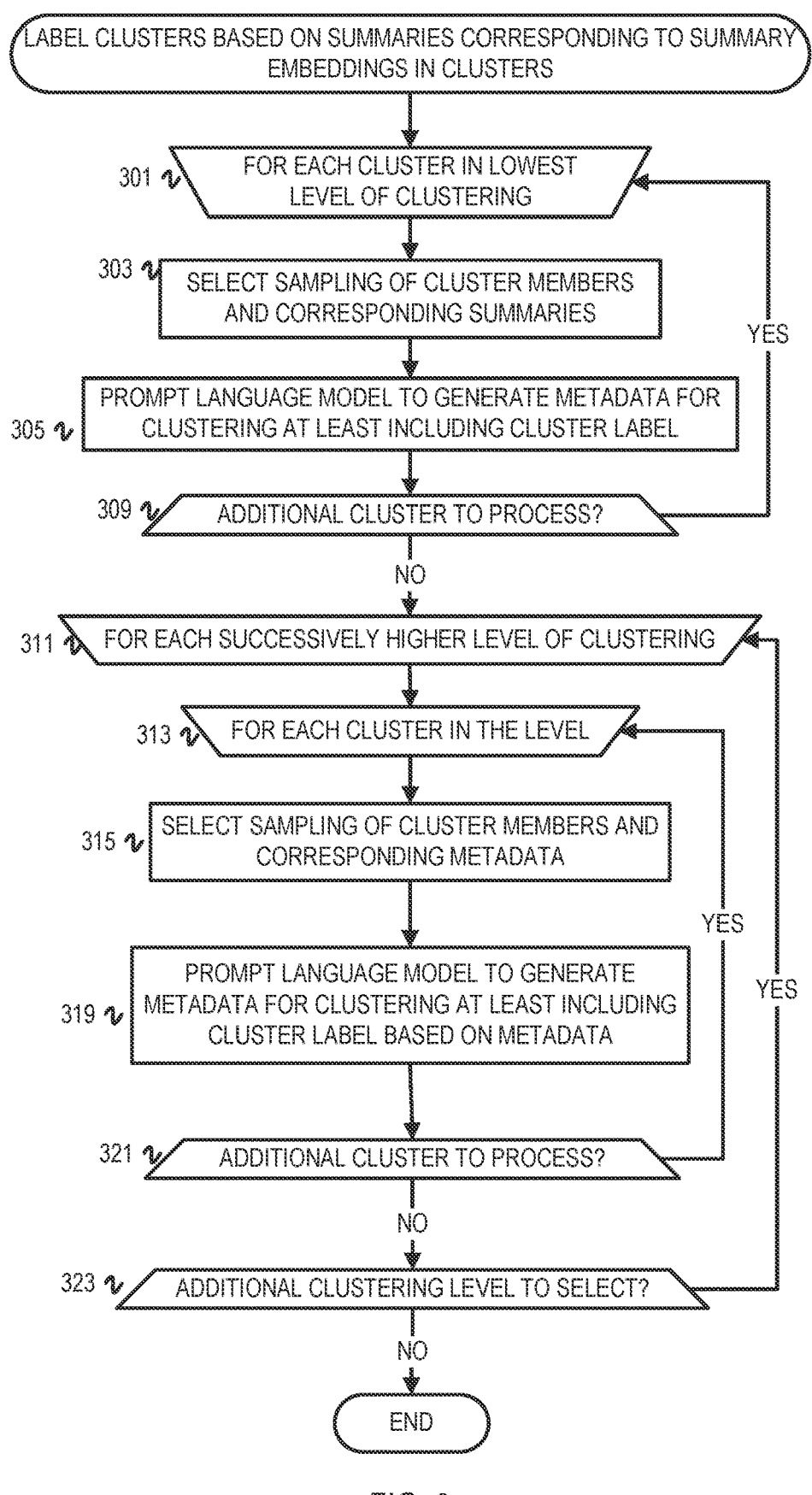
FIG. 3 is a flowchart of example operations for labelling clusters based on summaries corresponding to summary embeddings in clusters.

FIGS. 2-3 are flowcharts that provide more details for embodiments while being explained in broader terms than used in FIG. 1. However, FIGS. 2-3 describe operations with reference to a model pipeline for consistency with FIG. 1. Reference to a model pipeline is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of example operations for categorizing heterogeneous documents. The model pipeline referred to when describing the example operations at least includes a model for natural language processing tasks, a model for obtaining embeddings, and a clustering component.

Add block 201, the model pipeline iterates through the documents in a document collection. The model pipeline can be designed to retrieve documents from identified repositories that form the collection. Implementations can instead aggregate documents from different repositories into a repository accessible by the model pipeline. Implementations may also use program code external to the model pipeline to retrieve identified documents and input them into the model pipeline.

At block 203, the model pipeline prompts a language model to summarize the document according to a summarization constraint. The summarization constraint is used to normalize the summaries across the documents of the collection by limiting the summaries to approximately the same length. This normalization improves the embeddings which facilitates higher quality clustering at least by reducing noise while preserving meaning of the documents. The summarization constraint can be defined in terms of sentences or tokens. For example, summary length limit can be defined as three sentences or 150 tokens. The language model will have been trained or fine-tuned to generate summaries according to the summarization constraint making inclusion of the summary length limit in the prompt during inference unnecessary, but embodiments may include in a prompt during inference a task instruction specifying the length limit. As the document collection is heterogeneous, some documents may not be "long" documents (e.g., more than 500 tokens). In this case, the model pipeline can pad the document. For example, the model pipeline can append tokens that do not affect meaning (e.g., whitespace tokens or special token such as "<pad>") up to a long document length. Alternatively, the model pipeline can limit padding to documents that are less than the summary length limit. The summarization constraint can also include a target language. This can be implemented as part of training/fine-tuning or included as a task instruction in the prompt. Implementations can also pre-process documents to determine whether a document includes content not in the target language and translate the document before summarization. Implementations can include a marker or token in a document to indicate that the document included (prior to translation) text in multiple languages to inform the document classification. Markers/ tokens can be used that indicate the languages not in the target language or simply indicate that the document included text in a non-target language.

At block 205, the model pipeline obtains an embedding(s) for the summary and creates an input from the embedding(s) compatible with the clustering algorithm implementation of the model pipeline. Embodiments can obtain sentence embeddings for a summary and aggregate the sentence embeddings into a vector (e.g., concatenate the sentence embeddings) that can be processed by the clustering algorithm implementation. Embodiments can instead obtain and aggregate word embeddings or obtain a paragraph embedding for a summary and avoid the aggregating. While the model pipeline can use non-contextual embeddings, contextual embeddings allow for higher quality clustering. The model pipeline can obtain embeddings by extracting embeddings from a hidden layer of a model (e.g., transformer model, an ELMo model, a transformer model trained according to the Contriever framework, etc.). The model pipeline can instead obtain embeddings generated by models in a manner that is not extracting from a hidden layer. For example, the model pipeline can obtain embeddings generated from a Word2Vec model, a GloVe model, a paragraph vector model or Doc2Vec model, or token frequency-inverse document frequency (TF-IDF) model.

At block 207, the model pipeline determines whether there is another document in the collection to process. If there is an additional document to process, operational flow returns to block 201. Otherwise, operational flow proceeds to block 209.

At block 209, the model pipeline hierarchically clusters the summary embeddings. The model pipeline may preprocess the summary embeddings before clustering and then hierarchically cluster the summary embeddings with a clustering algorithm that performs divisive hierarchical clustering or that performs agglomerative hierarchical clustering. For preprocessing, the model pipeline may reduce dimensionality of the summary embeddings, for example using Uniform Manifold Approximation and Projection (UMAP). However, embodiments may choose to avoid concerns of density loss and/or of false tears in clusters and not reduce dimensionality or use a different algorithm than UMAP. Continuing with an example that preprocesses the summary embeddings with UMAP, the model pipeline can then cluster the summary embeddings with an implementation of hierarchical density-based spatial clustering of applications with noise (HDBSCAN). Implementations can use other clustering algorithms, such as a K-means clustering algorithm and the DBSCAN clustering algorithm. For divisive clustering, the model pipeline can begin with a ceiling distance to determine the level 2 clusters, again assuming the level 1 cluster includes all data points/summary embeddings. The model pipeline then divides each cluster into sub-clusters based on a defined step-down in distance, which can be a same or varying decrease in distance. The model pipeline repeats the clustering until divisively clustering on a floor distance for the leaf or lowest level of clustering. For agglomerative hierarchical clustering, the model pipeline can start with clusters of summary embeddings satisfying a floor distance to determine the lowest level clusters. Implementations can start with each summary embedding as a starting cluster. The model pipeline then proceeds to repetitively merge clusters into higher level clusters according to linkage parameters (e.g., linkage metric, linkage criterion, etc.).

At block 211, the model pipeline labels the clusters based on summaries corresponding to the summary embeddings in the clusters. For each cluster, metadata that at least includes a label is determined and applied to the cluster based on a sampling of cluster members. A more detailed explanation of the metadata generation is described with reference to FIG. 3.

At block 213, the model pipeline indicates the labeled clusters for an organized presentation of the documents. The model pipeline can include its own data visualization implementation or use a data visualization tool/package to render an organized presentation of the document collection. The organized presentation presents the document collection with representations that express the cluster labels and cluster members as document categories and sub-categories.

FIG. 3 is a flowchart of example operations for labelling clusters based on summaries corresponding to summary embeddings in clusters. Labelling clusters includes labelling sub-clusters. For a high quality categorization of the documents, the clustering labeling begins with the lowest level sub-clusters and propagates the information into parent clusters which preserves the detailed information available at the lowest level sub-clusters. The model pipeline will first iterate through the lowest level clusters/sub-clusters and then begin iterating through clusters in each successively higher level. Assuming the root cluster includes all documents, processing is on sub-clusters with respect to the root cluster. However, the description refers to clusters instead of sub-clusters to avoid confusion and since a sub-cluster is still a cluster.

At block 301, the model pipeline begins processing each cluster in the lowest level clustering. If the model pipeline implemented clustering that began with single member clusters, then the model pipeline would begin at the penultimate level of clustering (i.e., the model pipeline can skip processing the level of clustering with single member clusters). Clusters in the lowest level of clustering would have summary embeddings that satisfied a shortest clustering or linkage distance used for clustering.

At block 303, the model pipeline selects a sampling of cluster members and corresponding summaries. The model pipeline randomly selects the samples, for example using a random number generator. The sampling size can be informed by context window size of the language model that will generate the cluster metadata. For instance, if the context window size of the language model is 2000 tokens and each summary is approximately 200 tokens, then the sampling size would be less than 10 cluster members. However, quality of labeling may guide selection of a smaller sampling size. Too many summaries may yield less informative labels or less succinct labels. The sampling size can also be informed by degree of sub-categorization, which may be configurable in implementations. After selecting the cluster members that will be representative of the cluster, the model pipeline selects the corresponding summaries. As previously mentioned, the model pipeline maintains mappings among the pipeline artifacts. Thus, the model pipeline can retrieve the summaries that map to the summary embeddings. If a cluster has less members than the sample size, then all members are selected.

At block 305, the model pipeline prompts a language model to generate metadata for the cluster. While embodiments can only generate labels as metadata, additional information is often helpful for an organized presentation of a document collection, particularly enterprise scale collections. The model pipeline prompts a language model to summarize the selected summaries and generate a label from the selected summaries. The model pipeline then sets the metadata accordingly. Embodiments can prompt a language model to summarize the selected summaries and generate the label from the summarization of the summaries.

At block 309, the model pipeline determines whether there is another cluster in the lowest level of clustering to process. If so, operational flow returns to block 301. If not, operational flow proceeds to block 311.

At block 311, the model pipeline begins selecting each successively higher level of clustering from the lowest level of clustering. At block 313, the model pipeline begins processing each cluster in the selected level. An artifact of the clustering includes data that indicates cluster memberships. The model pipeline can use this clustering artifact or clustering metadata to determine clusters in each level and cluster memberships.

At block 315, the model pipeline selects a sampling of cluster members and the corresponding metadata. This is similar to the example operation of block 303, except the metadata is selected instead of the summaries. If the currently selected level of clustering is level h, then the clusters in level h+1 will already have metadata set. The sampling size for the higher level clusters can be the same or different than the sampling size of the lowest level of clustering.

At block 319, the model pipeline prompts the language model to generate metadata for the cluster. If the metadata only includes labels, then the model pipeline can prompt the language model to generate a label from the labels of the samples. If the metadata includes cluster descriptions, then the model pipeline can prompt the language model to generate a summary of the descriptions to be the cluster description and a cluster label from either the sample descriptions or the summary of the sample description.

At block 321, the model pipeline determines if there is another cluster to process in the currently selected level. If there is another cluster to process, then operational flow returns to block 313. Otherwise, operational flow proceeds block 323.

At block 323, the model pipeline determines if there is another clustering level to select. If there is another cluster level to select, then operational flow returns to block 311. Otherwise, operational flow ends.

Variations

The examples described above presume design choices that lead to at least two language models being used in the pipeline: a first language model for generating constrained summaries of documents and a second language model to generate cluster metadata that at least includes cluster labels. This example model configuration is driven by a design that preserves privacy of an organization's documents with an internally hosted language model for summarizing the documents which can also be a cost sensitive design choice. The second model can also be an internally hosted model that has been fine-tuned, or can be a pre-trained, publicly available model/third party hosted model. If the second model is a third-party hosted model, selected summaries can be filtered for sensitive information. If sensitive information is detected in a summary, then a substitute or replacement sample can be selected. Instead of two language models, embodiments can employ the same language model for constrained summarization of documents and generating cluster metadata assuming the owner of the document collection has already filtered the collection to remove documents with sensitive information.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in FIG. 2 can be performed differently. An implementation can generate a batch or all summaries for a document collection before obtaining embeddings. An implementation can employ separate processes or threads that run concurrently to summarize, obtain embeddings, and cluster. In addition, implementations can forgo the sampling of clusters when resource conservation is not a concern. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
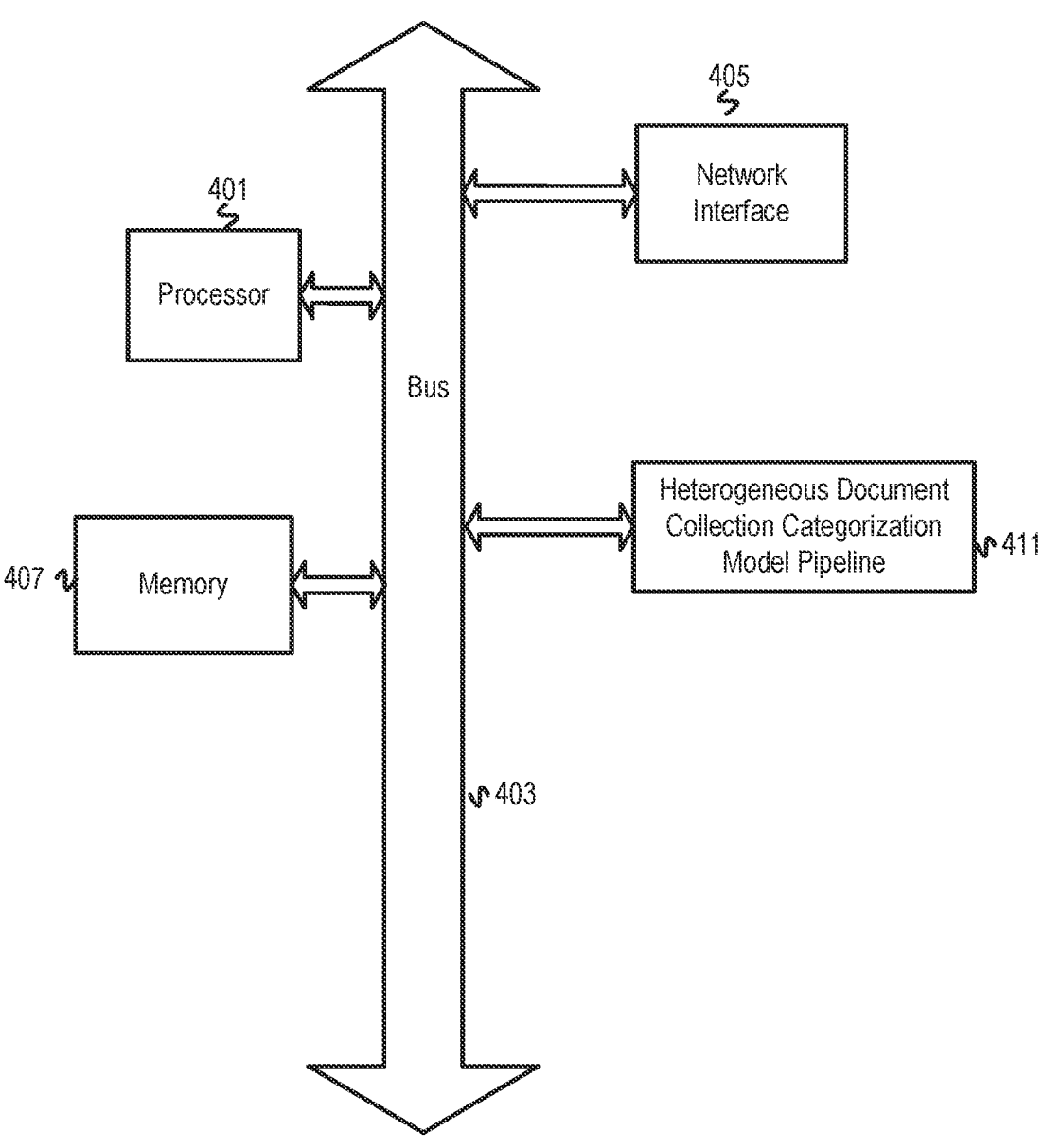
FIG. 4 depicts an example computer system with a model pipeline that categorizes content/documents in a heterogeneous document collection.

FIG. 4 depicts an example computer system with a model pipeline that categorizes content/documents in a heterogeneous document collection. The computer system includes a processor 401 (possibly including multiple processors, multiple cores, multiple nodes, and/or implementing multithreading, etc.). The computer system includes memory 407. The memory 407 may be system memory or any one or more of the above already described possible realizations of machine-readable media. The computer system also includes a bus 403 and a network interface 405. The system also includes model pipeline 411 that categorizes content/documents in a heterogeneous document collection. The model pipeline 411 employs generative artificial intelligence (e.g., transformer models) to summarize constituent documents and machine learning, specifically hierarchical clustering, to cluster vector representations of the document summaries. The model pipeline 411 comprises a language model that is fine-tuned or prompted to normalize the document collection by summarizing each document to a summary length limit. The normalization removes what would be noise and yields improved vector representations/embeddings, which in turn lead to higher quality clustering. If the model pipeline 411 uses multiple language models, another language model is fine-tuned (e.g., with few shot prompting or limited additional training) to generate cluster metadata based on the summaries for the lowest level clusters and based on metadata of sub-clusters for higher level clusters. In this case, the language models can be lightweight models (e.g., tens of millions of parameters instead of billions of parameters) that are internally hosted to preserve privacy of document content. After clustering summary embeddings and assigning metadata to the clusters, the clustering and cluster metadata can be used with a data presentation tool (e.g., a data visualization tool/package) to render an organized presentation of the document collection with categories and sub-categories. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
summarizing each of a plurality of documents with a first language model, wherein the first language model has been tuned to generate summaries of approximately a same length and has been tuned with documents of different domains at least including natural language documents and program code documents;
obtaining embeddings of the summaries;
clustering the embeddings which generates a plurality of clusters; and
labeling each cluster of the plurality of clusters based on the summaries of those of the plurality of documents corresponding to at least a subset of members of the cluster, wherein labeling each cluster of the plurality of clusters comprises generating labels with a second language model based on the summaries of those of the plurality of documents corresponding to at least a subset of members of the cluster.

2. The method of claim 1, wherein at least some of the plurality of documents are long documents.

3. The method of claim 1 further comprising fine tuning the first language model to constrain a summary to a defined limit, wherein the defined limit is in terms of sentences or tokens.

4. The method of claim 3, wherein fine tuning the first language model further comprises fine tuning the first language model to generate summaries in a specified language.

5. The method of claim 1, wherein obtaining the embeddings of the summaries comprises one of extracting embeddings from a model and generating the embeddings from a model.

6. The method of claim 1 further comprising:
repeatedly dividing each of the plurality of clusters from a highest level to a lowest level; and
wherein labeling each cluster of the plurality of clusters comprises,
for each sub-cluster of the lowest level of clustering, selecting a subset of members of the sub-cluster and generating with the second language model a label and a description for the sub-cluster based on those of the summaries corresponding to the selected subset of the members of the sub-cluster; and
for each cluster for each successively higher level of clustering from the lowest level, selecting a subset of members of the cluster and generating with the second language model a label and description for the cluster based on labels and descriptions of the selected subset of members of the cluster.

7. The method of claim 1 further comprising generating descriptions for each of the clusters with the second language model based, at least in part, on the summaries of those of the plurality of documents corresponding to at least a subset of members of the cluster.

8. The method of claim 1, wherein clustering the embeddings comprises hierarchically clustering the embeddings and wherein labeling each cluster of the plurality of clusters comprises,
wherein labeling comprises,
generating labels for clusters of a lowest level with the second language model based on the summaries of those of the plurality of documents of a sampling of members of the lowest level sub-cluster; and for each cluster of a successively higher level, generating a label for the cluster with the second language model based on a sampling of labels of clusters of the preceding level within the higher level cluster.

9. The method of claim 1 further comprising generating an organized presentation of the plurality of documents based, at least in part, on the clustering and with categories and sub-categories corresponding to the labels of the plurality of clusters.

10. A non-transitory, machine-readable medium having program code stored thereon, the program code comprising instructions to:

generate an organized presentation of a plurality of documents across multiple domains with a model pipeline, wherein the instructions to generate the organized presentation of the plurality of documents comprise instructions to, generate a summary of each of the plurality of documents with a first language model that has been trained to generate summaries constrained to a defined limit;

for each summary, obtain an embedding of the summary;

hierarchically cluster the embeddings;

for each leaf cluster, select a subset of members of the leaf cluster and generate a label for the leaf cluster with a second language model based on those of the summaries corresponding to the selected subset; and for each parent cluster, select a subset of the members of the parent cluster and generate a label for the parent cluster with the second language model based on labels of the selected subset of members of the parent cluster.

11. The machine-readable medium of claim 10, wherein the instructions to generate the organized presentation of the plurality of documents further comprise instructions to:

for each leaf cluster, generate a description for the leaf cluster with the second language model based on those of the summaries corresponding to the selected subset of members of the leaf cluster.

12. The machine-readable medium of claim 11, wherein the instructions to generate the organized presentation of the plurality of documents further comprise instructions to:

for each parent cluster, generate a description for the parent cluster with the second language model based on descriptions of the selected subset of members of the parent cluster.

13. The machine-readable medium of claim 10, wherein at least some of the plurality of documents are long documents.

14. The machine-readable medium of claim 10, wherein the program code further comprises instructions to fine tune the first language model to constrain a summary to the defined limit, wherein the defined limit is in terms of sentences or tokens.

15. The machine-readable medium of claim 10, wherein the program code further comprises instructions to fine tune the first language model with training data across the multiple domains, wherein the training data across the multiple domains comprise natural language documents and program code documents.

16. An apparatus comprising:

a processor;

a machine-readable medium having instructions stored thereon that are executable by the processor to cause the apparatus to, generate an organized presentation of a plurality of documents across multiple domains with a model pipeline, wherein the instructions to generate the organized presentation of the plurality of documents comprise instructions to, generate a summary of each of the plurality of documents with a first language model that has been trained to generate summaries constrained to a defined limit;

for each summary, obtain an embedding of the summary;

hierarchically cluster the embeddings;

for each leaf cluster, select a subset of members of the leaf cluster and generate a label for the leaf cluster with a second language model based on those of the summaries corresponding to the selected subset; and for each parent cluster, select a subset of the members of the parent cluster and generate a label for the parent cluster with the second language model based on labels of the selected subset of members of the parent cluster.

17. The apparatus of claim 16, wherein the instructions to generate the organized presentation of the plurality of documents further comprise instructions executable by the processor to cause the apparatus to:

for each leaf cluster, generate a description for the leaf cluster with the second language model based on those of the summaries corresponding to the selected subset of members of the leaf cluster.

18. The apparatus of claim 17, wherein the instructions to generate the organized presentation of the plurality of documents further comprise instructions executable by the processor to cause the apparatus:

for each parent cluster, generate a description for the parent cluster with the second language model based on descriptions of the selected subset of members of the parent cluster.

19. The apparatus of claim 16, wherein the machine-readable medium further has stored thereon instructions executable by the processor to cause the apparatus to fine tune the first language model to constrain a summary to the defined limit, wherein the defined limit is in terms of sentences or tokens.

20. The apparatus of claim 16, wherein the machine-readable medium further has stored thereon instructions executable by the processor to cause the apparatus to fine tune the first language model with training data across the multiple domains, wherein the training data across the multiple domains comprise natural language documents and program code documents.

21. The apparatus of claim 16, wherein at least some of the plurality of documents are long documents.

* * * * *